United States Patent
Gandhi et al.

(10) Patent No.: US 9,934,449 B2
(45) Date of Patent: Apr. 3, 2018

(54) METHODS AND SYSTEMS FOR DETECTING TOPIC TRANSITIONS IN A MULTIMEDIA CONTENT

(71) Applicant: YEN4KEN, INC., Princeton, NJ (US)

(72) Inventors: Ankit Gandhi, Raipur (IN); Arijit Biswas, Kolkata (IN); Om D Deshmukh, Bangalore (IN)

(73) Assignee: VIDEOKEN, INC., Newark, DE (US)

( * ) Notice: Subject to any disclaimer, the term of this patent is extended or adjusted under 35 U.S.C. 154(b) by 0 days.

(21) Appl. No.: 15/015,179

(22) Filed: Feb. 4, 2016

(65) Prior Publication Data

US 2017/0228614 A1    Aug. 10, 2017

(51) Int. Cl.
| | |
|---|---|
| *G06K 9/68* | (2006.01) |
| *G06K 9/62* | (2006.01) |
| *H04L 29/06* | (2006.01) |
| *H04L 29/08* | (2006.01) |
| *G09B 5/06* | (2006.01) |
| *G06K 9/18* | (2006.01) |
| *G06F 17/27* | (2006.01) |
| *G06K 9/00* | (2006.01) |
| *G06K 9/46* | (2006.01) |

(52) U.S. Cl.
CPC ....... *G06K 9/6215* (2013.01); *G06F 17/2765* (2013.01); *G06K 9/00751* (2013.01); *G06K 9/18* (2013.01); *G06K 9/4676* (2013.01); *G06K 9/6202* (2013.01); *G06K 9/6219* (2013.01); *G09B 5/065* (2013.01); *H04L 67/12* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,363,380 B1 * | 3/2002 | Dimitrova | G06F 17/30787 707/740 |
| 6,751,354 B2 * | 6/2004 | Foote | G06K 9/00758 348/395.1 |
| 8,670,978 B2 | 3/2014 | Nagatomo | |

(Continued)

OTHER PUBLICATIONS

Geyer, Charles J. Stats 5101 Notes: Brand Name Distributions. University of Minnesota, Feb. 14, 2003, www.stat.umn.edu/geyer/old03/5102/notes/brand.pdf. 22 pages.*

(Continued)

*Primary Examiner* — Ryan P Potts
(74) *Attorney, Agent, or Firm* — LeonardPatel PC

(57) ABSTRACT

A method for detecting one or more topic transitions in a multimedia content includes identifying, one or more frames from a plurality of frames of the multimedia content based on a comparison between one or more content items in a first frame of the plurality of frames, and the one or more content items in a first set of frames of the plurality of frames. The method further includes determining at least a first score, and a second score for each of the one or more frames. Additionally, the method includes determining a likelihood for each of the one or more frames based at least on the first score, and the second score, wherein the likelihood is indicative of a topic transition among the one or more frames.

12 Claims, 7 Drawing Sheets

(56) References Cited

U.S. PATENT DOCUMENTS

| | | | |
|---|---|---|---|
| 2004/0143434 A1* | 7/2004 | Divakaran | G06F 17/30743 704/256 |
| 2007/0124678 A1* | 5/2007 | Agnihotri | G06F 17/30796 715/720 |
| 2008/0066136 A1 | 3/2008 | Dorai et al. | |
| 2008/0193016 A1* | 8/2008 | Lim | G06F 17/30787 382/190 |
| 2008/0316307 A1* | 12/2008 | Petersohn | G06K 9/00765 348/135 |
| 2011/0246183 A1* | 10/2011 | Nagatomo | G06F 17/30731 704/9 |
| 2012/0011109 A1 | 1/2012 | Ambwani et al. | |
| 2013/0036124 A1 | 2/2013 | Ambwani et al. | |
| 2013/0183022 A1* | 7/2013 | Suzuki | G06K 9/00718 386/241 |

OTHER PUBLICATIONS

Li, Kai, et al. "Structuring lecture videos by automatic projection screen localization and analysis." IEEE transactions on pattern analysis and machine intelligence 37.6 (2015): 1233-1246. 14 pages.*

U.S. Appl. No. 14/798,499, filed Jul. 14, 2015; Methods and Systems for Indexing Multimedia Content; Biswas et al.

D. M. Blei. Probabilistic topic models. Commun. ACM, 55(4):77-84, 2012.

L. Neumann and J. Matas. Scene text localization and recognition with oriented stroke detection. In 2013 IEEE International Conference on Computer Vision (ICCV 2013), pp. 97-104. IEEE, 2013.

* cited by examiner

METHODS AND SYSTEMS FOR DETECTING TOPIC TRANSITIONS IN A MULTIMEDIA CONTENT

TECHNICAL FIELD

The presently disclosed embodiments are related, in general, to multimedia content processing. More particularly, the presently disclosed embodiments are related to methods and systems for detecting one or more topic transitions in a multimedia content.

BACKGROUND

Advancements in the field of education have led to the usage of Massive Open Online Courses (MOCCs) as one of the popular modes of learning. Educational organizations provide multimedia content in the form of video lectures, and/or audio lectures to students for learning. Such multimedia content may contain a plurality of topics that are discussed over duration of the multimedia content.

Usually, the duration of such multimedia content (e.g., educational multimedia content) may be long as compared to the duration of non-educational multimedia content. A student accessing the multimedia content may be interested in at least one topic discussed in the multimedia content. To access the portion of the multimedia content that corresponds to the beginning of the at least one topic, the student may have to navigate back and forth within the multimedia content. The process to navigate back and forth within the multimedia content, and identifying the beginning of the at least one topic, may be a cumbersome process.

Therefore, manual identification of all the topic transition points in the multimedia content is a non-trivial task.

SUMMARY

According to embodiments illustrated herein there is provided a method for detecting one or more topic transitions in a multimedia content. The method includes identifying one or more frames from a plurality of frames of the multimedia content based on a comparison between one or more content items in a first frame of the plurality of frames, and the one or more content items in a first set of frames of the plurality of frames, wherein an occurrence of the first set of frames is temporally prior to the first frame. The method further includes determining at least a first score, and a second score for each of the one or more frames, based on a set of dissimilar content items, and a set of similar content items among the one or more frames, respectively. In addition, the method includes determining a likelihood for each of the one or more frames based at least on the first score, and the second score, wherein the likelihood is indicative of a topic transition among the one or more frames.

According to embodiments illustrated herein there is provided a system for detecting one or more topic transitions in a multimedia content. The system includes one or more processors configured to identify, one or more frames from a plurality of frames of the multimedia content based on a comparison between one or more content items in a first frame of the plurality of frames, and the one or more content items in a first set of frames of the plurality of frames, wherein an occurrence of the first set of frames is temporally prior to the first frame. The method further includes the one or more processors configured to determine, at least a first score, and a second score for each of the one or more frames, based on a set of dissimilar content items, and a set of similar content items among the one or more frames respectively. In addition, the method includes the one or more processors further configured to determine, a likelihood for each of the one or more frames based at least on the first score, and the second score, wherein the likelihood is indicative of a topic transition among the one or more frames.

According to embodiments illustrated herein there is provided a computer program product for use with a computer, the computer program product comprising a non-transitory computer readable medium, wherein the non-transitory computer readable medium stores a computer program code for detecting one or more topic transitions in a multimedia content. The computer program code is executable by one or more processors to identify, one or more frames from a plurality of frames of the multimedia content based on a comparison between one or more content items in a first frame of the plurality of frames, and the one or more content items in a first set of frames of the plurality of frames, wherein an occurrence of the first set of frames is temporally prior to the first frame. The computer program code is further executable by the one or more processors to determine, at least a first score, and a second score for each of the one or more frames, based on a set of dissimilar content items, and a set of similar content items among the one or more frames respectively. In addition, the computer program code is executable by the one or more processors to determine, a likelihood for each of the one or more frames based at least on the first score, and the second score, wherein the likelihood is indicative of a topic transition among the one or more frames.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
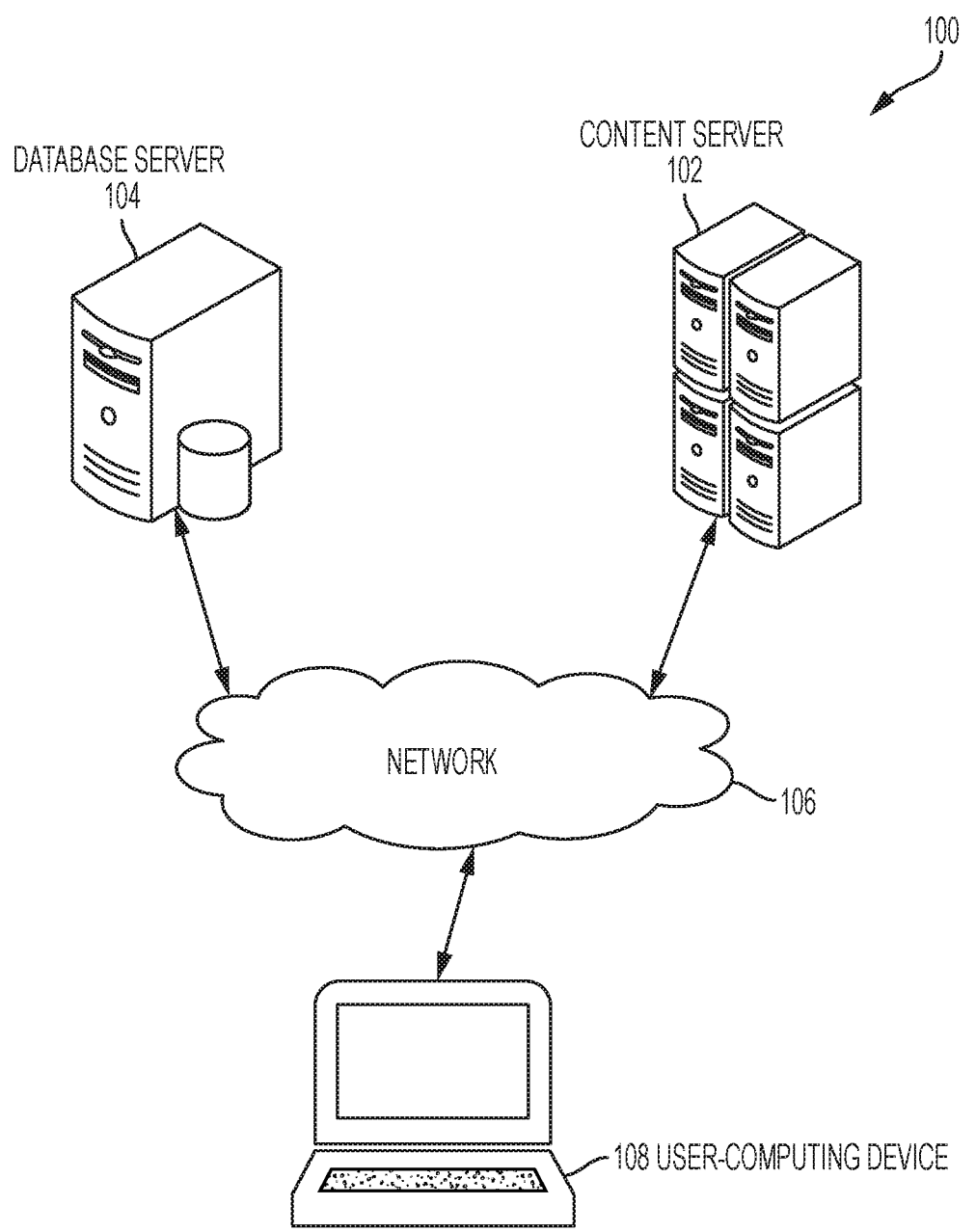
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "multimedia content" may correspond to at least one of, but not limited to, an audio content, a video content, text content, an image, or an animation. In an embodiment, the multimedia content may be rendered through a media player such as VLC Media player, Windows Media Player, Adobe Flash Player, Apple QuickTime Player, etc., on a computing device. In an embodiment, the media player may include one or more coding/decoding libraries that enable the media player to render the multimedia content. In an embodiment, the multimedia content may be downloaded or streamed from a multimedia server to the computing device. In an alternate embodiment, the multimedia content may be stored on a media storage device such as Hard Disk Drive, CD Drive, Pen Drive, etc., connected to (or inbuilt within) the computing device.

A "frame" may refer to an image that corresponds to a single picture or a still shot that is a part of a larger multimedia content (e.g. a video). A multimedia content is usually composed of a plurality of frames that is rendered, on a display device, in succession to produce what appears to be a seamless piece of the multimedia content.

A "topic transition" may correspond to frames or timestamps (in the multimedia content) that are indicative of a topic change in a multimedia content. For example, when the multimedia content corresponds to an educational content, an instructor in the educational content may have touched upon various topics during the playback duration of the educational content. For instance, the instructor in the educational content has covered five different topics that begins at frames $S_7$, $S_{20}$, $S_{45}$, $S_{60}$, and $S_{87}$, respectively. Then the frames $S_7$, $S_{20}$, $S_{45}$, $S_{60}$, and $S_{87}$ correspond to topic transitions in the multimedia content.

"One or more content items" may refer to one or more keywords or pixels data in plurality of frames of a multimedia content. In an embodiment, the one or more keywords may correspond to text content in the plurality of frames of the multimedia content. In an embodiment, the one or more content items (e.g., one or more keywords) may be identified by using one or more character recognition techniques such as, but not limited to, optical character recognition. In an embodiment, the pixel data may correspond to an element of data that may be provided in any format, color space, or compression state that is associated with or readily convertible into data that can be associated with a small area or spot in a frame of the plurality of frames. In addition, the pixel data is represented by bits where the number of bits in a pixel is indicative of the information associated with the pixel data. In another embodiment, the one or more content items may also correspond to an object/image in the plurality of frames of the multimedia content.

"One or more frames" may refer to frames in a multimedia content that may be unique with respect to each other. In an alternate embodiment, similarity/commonality between one or more content items in the one or more frames is less than a predefined threshold. In an embodiment, to identify the one or more frames in the multimedia content, the one or more content items in a first frame of the plurality of frames of the multimedia content, may be compared with the one or more content items in all the frames that occur temporally prior to the first frame based on the predefined threshold. If the similarity/commonality (determined based on the comparison) of the one or more content items of the first frame is below the predefined threshold, the first frame is considered unique and may correspond to the one or more frames. The one or more comparison techniques for identifying the one or more frames are keyword overlap, pixel difference, and/or the like.

A "window" refers to a neighborhood defined for a frame in a multimedia content, such that a set of frames in the neighborhood of the frame occur temporally prior to the frame, in the multimedia content. In an embodiment, the count of frames in the window may be predefined by a user. For example, let one or more frames in the multimedia content be represented as, $S=\{S_1, S_2, S_3, S_4, S_5, S_6\}$ and the count of frames in the window is four, then $\{S_2, S_3, S_4, S_5\}$ may correspond to the window for the frame $S_6$.

A "set of similar content items" may refer to a set of content items that are common between a frame in one or more frames of a multimedia content and a window, from the frame, encompassing a set of frames, occurring temporally prior to the frame, from the one or more frames. In an embodiment, the set of similar content items is determined based on a degree of similarity between one or more content items of the frame and one or more content items of the window. For example, let the one or more content items in the frame be {pixel, data, dimension, study, text, location} and the one or more content items in the window be {data, first, allocation, pixel, images}, then {data, pixel} corresponds to the set of similar content items.

A "set of dissimilar content items" may refer to a set of content items that are different between a frame in one or more frames of a multimedia content and a window, from the frame, encompassing a set of frames, occurring temporally prior to the frame, from the one or more frames. In an embodiment, the set of dissimilar content items is determined based on a degree of dissimilarity between one or more content items of the frame and one or more content items of the window. For example, let the one or more content items in the frame be {pixel, data, dimension, study, text, location} and the one or more content items in the window be {data, first, allocation, pixel, images}, then {dimension, study, text, location} corresponds to the set of dissimilar content items.

A "first score" refers to a score indicative of a degree of dissimilarity between one or more frames in a multimedia content. In an embodiment, the first score is determined based on a set of dissimilar content items, of one or more content items, in one or more frames of the multimedia content.

A "second score" refers to a score indicative of a degree of similarity between one or more frames in a multimedia content. In an embodiment, the second score is determined based on a set of similar content items, of one or more content items, in one or more frames of the multimedia content.

A "saliency score" refers to a score that represents a degree of importance of each of one or more content items in a frame of a multimedia content. In an embodiment, one or more known techniques are utilized to assign the saliency score to each of the one or more content items. Examples of such techniques may include a Text Rank technique, a PageRank technique, and the like. For instance, when the one or more content items correspond to one or more keywords in a frame of the multimedia content, the saliency score computed for a keyword may represent the degree of importance of each keyword in the one or more keywords.

"Aesthetic features" refer to features that are deterministic or representative of look and feel of a content item in a frame. For instance, when the content item corresponds to text, the aesthetic features associated with the text may comprise, but are not limited to, underline, highlight, bold, italics, a font size of the text, a color of the text, and a relative location of the text in a corresponding frame of the multimedia content. In another embodiment, when the content item corresponds to an object/image, the aesthetic features associated with the objects or images may comprise, but are not limited to, a size of the object/image, a relative location of the object/image in a corresponding frame of the multimedia content.

"Keyword overlap score" may refer to a degree of similarity between one or more keywords in a frame and one or more keywords in a first set of frames. In an embodiment, identical keywords may have a high keyword overlap score compared with non-identical keywords. In an embodiment, the keyword overlap score may be utilized to identify one or more frames (unique frames) in a plurality of frames of a multimedia content.

A "Pixel difference" may refer to a degree of similarity between pixel data in a frame and pixel data in a first set of frames. In an embodiment, the pixel difference between any two frames of a multimedia content may be obtained by performing subtraction between the two frames. In an embodiment, if the pixel difference between two frames of the multimedia content is below a predefined threshold, the two frames may be considered similar. Else the two frames are considered dissimilar. In an embodiment, the pixel difference may be utilized to identify one or more frames (unique frames) in a plurality of frames of the multimedia content.

FIG. 1 is a block diagram illustrating a system environment 100 in which various embodiments may be implemented. The system environment 100 includes a content server 102, a database server 104, a network 106, and a user-computing device 108.

In an embodiment, the content server 102 may refer to a computing device or a software framework hosting an application or a software service. In an embodiment, the content server 102 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the content server 102 may be configured to transmit a query to the database server 104 to retrieve a multimedia content. In an embodiment, the content server 102 may be configured to playback the multimedia content through a media player such as a VLC Media Player, a Windows Media Player, an Adobe Flash Player, an Apple QuickTime Player, and the like. In another embodiment, the content server 102 may be configured to stream the multimedia content on a user-computing device 108 over the network 106. The content server 102 may be realized through various types of application servers such as, but are not limited to, a Java application server, a .NET framework application server, a Base4 application server, a PHP framework application server, or any other application server framework. In an embodiment, the content server 102 may be configured to detect one or more topic transitions in the multimedia content based on a plurality of topics presented in the multimedia content. The operation of the content server 102 has been discussed later in conjunction with FIG. 2.

In an embodiment, the content server 102 may be configured to present a user interface on the user-computing device 108. Further, the content server 102 may be configured to stream the multimedia content on the user-computing device 108 through the user interface.

A person having ordinary skill in the art will appreciate that the scope of the disclosure is not limited to realizing the content server 102 and the user-computing device 108 as separate entities. In an embodiment, the content server 102 may be realized as an application program installed on and/or running on the user-computing device 108 without departing from the scope of the disclosure.

In an embodiment, the database server 104 may refer to a computing device that may be configured to store the multimedia content. In an embodiment, the database server 104 may include a special purpose operating system specifically configured to perform one or more database operations on the multimedia content. Examples of the one or more database operations may include, but are not limited to, Select, Insert, Update, and Delete. In an embodiment, the content server 102 may utilize various querying languages such as SQL, QUEL, DMX and so forth to query the database server 104. Further, the database server 104 may be realized through various technologies such as, but not limited to, Microsoft® SQL server, Oracle, and My SQL, and may be connected to the content server 102 and the network 106, using one or more protocols such as, but not limited to, ODBC protocol and JDBC protocol. In an embodiment, the database server 104 may be connected to the user-computing device 108, over the network 106.

In an embodiment, the database server 104 may be configured to retrieve the multimedia content from a plurality of data sources. Examples of the plurality of data sources may include, but are not limited to, social media, blogs, websites, and streaming servers. In an embodiment, an entity may use a computing device to upload the multimedia content to the database server 104. Examples of the entity may include, but are not limited to, an educational institution, an online video streaming service provider, a student, and a professor. The database server 104 may be configured to receive a query from the content server 102 to obtain the multimedia content. Thereafter, the database server 104 may be configured to transmit the multimedia content to the content server 102, via the network 106.

A person with ordinary skill in the art will understand that the scope of the disclosure is not limited to the database server 104 as a separate entity. In an embodiment, the functionalities of the database server 104 may be integrated into the content server 102, and vice versa.

In an embodiment, the network 106 may correspond to a communication medium through which the database server 104, and the content server 102 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user-computing device 108 refers to a computing device used by a user. The user-computing device 108 comprises of one or more processors and one or more memories. The one or more memories may include computer readable code that is executable by the one or more processors to perform predetermined operations. In an embodiment, the user-computing device 108 may include hardware and software that may be configured to display the multimedia content streamed by the content server 102. Examples of the user-computing device 108 include, but are not limited to, a personal computer, a laptop, a personal digital assistant (PDA), a mobile device, a tablet, or any other computing device.

Figure 2:
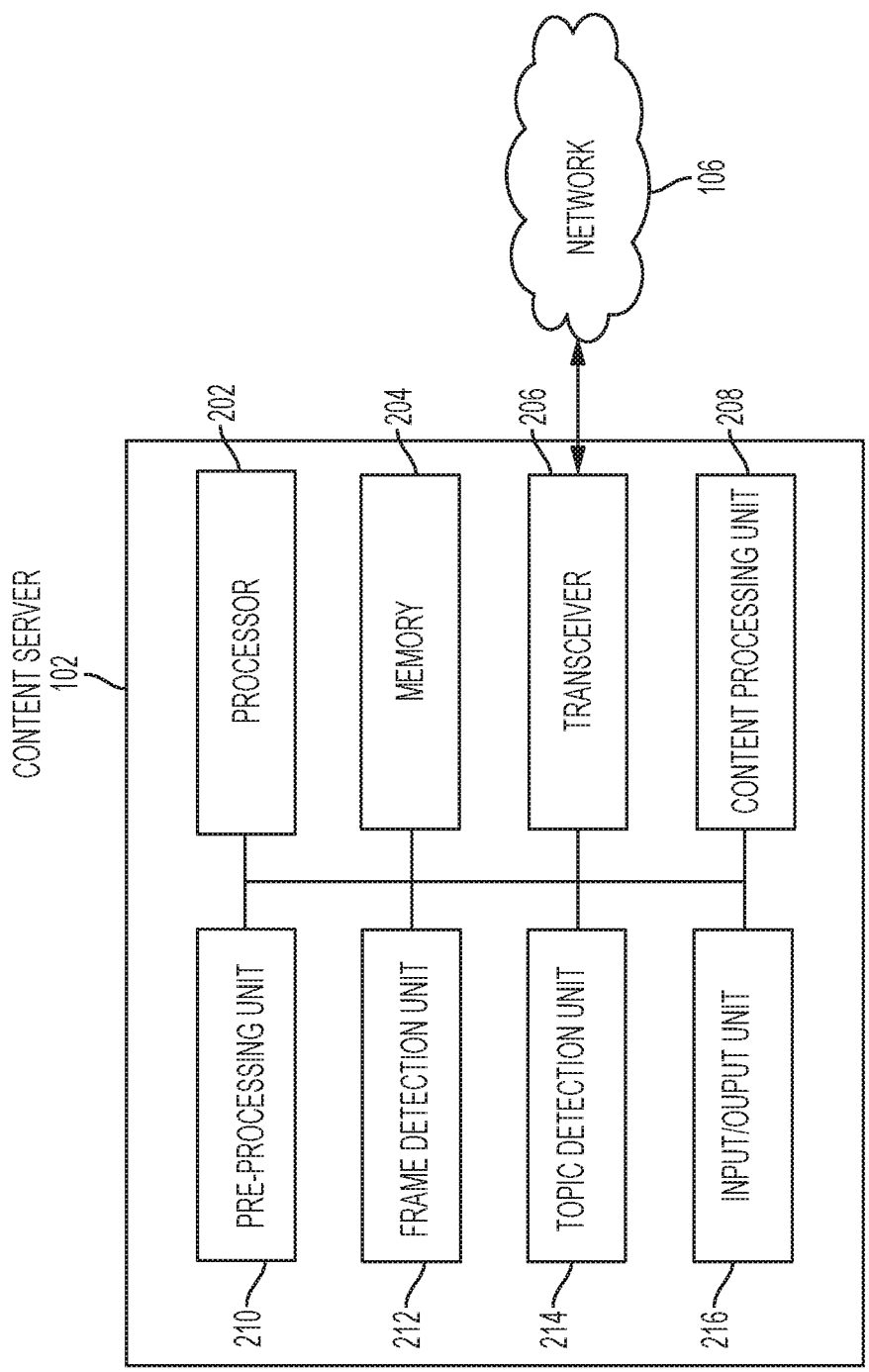
FIG. 2 is a block diagram illustrating a content server, in accordance with at least one embodiment.

FIG. 2 is a block diagram illustrating the content server 102, in accordance with at least one embodiment. FIG. 2 has been explained in conjunction with FIG. 1.

The content server 102 includes a processor 202, a memory 204, a transceiver 206, a content processing unit 208, a pre-processing unit 210, a frame detection unit 212, a topic detection unit 214, and an input/output unit 216. The processor 202 may be communicatively coupled to the memory 204, the transceiver 206, the content processing unit 208, the pre-processing unit 210, the frame detection unit 212, the topic detection unit 214, and the input/output unit 216. The transceiver 206 may be communicatively coupled to the network 106.

The processor 202 comprises suitable logic, circuitry, interfaces, and/or code that may be configured to execute a set of instructions stored in the memory 204. The processor 202 may be implemented based on a number of processor technologies known in the art. The processor 202 may work in coordination with the transceiver 206, the content processing unit 208, the pre-processing unit 210, the frame detection unit 212, the topic detection unit 214, and the input/output unit 216 to detect the one or more topic transitions in the multimedia content. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 stores a set of instructions and data. Some of the commonly known memory implementations include, but are not limited to, a random access memory (RAM), a read only memory (ROM), a hard disk drive (HDD), a solid state drive (SDD) and a secure digital (SD) card. Further, the memory 204 includes the one or more instructions that are executable by the processor 202 to perform specific operations on the multimedia content. It is apparent to a person having ordinary skills in the art that the one or more instructions stored in the memory 204 enables the hardware of the content server 102 to perform the predetermined operation on the multimedia content.

The transceiver 206 comprises suitable logic, circuitry, interfaces, and/or code that may be configured to receive the multimedia content from the database server 104, via the network 106. The transceiver 206 may be further configured to transmit the user interface to the user-computing device 108, via the network 106. Further, the transceiver 206 may be configured to stream the multimedia content to the user-computing device 108, over the network 106. The transceiver 206 may implement one or more known technologies to support wired or wireless communication with the network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data for GSM Evolution (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The content processing unit 208 comprises suitable logic, circuitry, interfaces, and/or code that may be configured to extract one or more content items from the multimedia content. The one or more content items may correspond to one or more keywords that may be displayed during playback of the multimedia content and/or pixel data of the multimedia content. In an embodiment, the one or more content items may correspond to the keywords that may be referred to, by a presenter in the multimedia content to explain/describe a topic. For example, the one or more content items may be extracted from text content in a slide, which is being displayed during the playback of the multimedia content. Further, the presenter may refer to the displayed slide to explain/describe the topic. In an embodiment, the content processing unit 208 may be implemented as an Application-Specific Integrated Circuit (ASIC) microchip designed for a special application, such as to extract the one or more content items from the multimedia content based on one or more character recognition (CR) techniques. Examples of CR techniques may include performing one or more operations, but are not limited to, a de-skewing, a binarization, a line removal, a line and word detection, a script detection, a character isolation and a segmentation. In an embodiment, the content processing unit 208 may be configured to extract an image from the multimedia content and compare the image with a stored image, in the memory 204, on a pixel-by-pixel basis. Based on the comparison, the content processing unit 208 may extract the one or more content items from the multimedia content. Further, the content processing unit 208 may determine a saliency score associated with each content item in the one or more content items.

The pre-processing unit 210 comprises suitable logic, circuitry, interfaces, and/or code that may be configured to perform a stemming operation on the one or more content items (e.g., one or more keywords). In an embodiment, the stemming operation may be performed using third party tools such as, Porter Stemmer, Stemka, and the like. In an embodiment, the stop words such as, 'and', 'it', 'the' may be removed from the one or more keywords. In an embodiment, the pre-processing unit 210 may be configured to cluster the one or more keywords. The pre-processing unit 210 may perform clustering of the one or more keywords by using state-of-the-art clustering techniques such as Agglomerative Hierarchical Clustering, Divisive Hierarchical clustering, and the like. In an embodiment, the pre-processing unit 210 may be implemented as an Application-Specific Integrated Circuit (ASIC) microchip designed for a special application, such as to remove stop words comprising conjunctions, prepositions, and the like from the one or more keywords.

The frame detection unit 212 comprises suitable logic, circuitry, interfaces, and/or code that may be configured to identify one or more frames from a plurality of frames of the multimedia content. The frame detection unit 212 may be configured to compare the one or more content items in a first frame of the plurality of frames with the one or more content items in a first set of frames to identify the one or more frames. In an embodiment, the first set of frames occurs temporally prior to the first frame. In an embodiment, the frame detection unit 212 may be implemented as an Application-Specific Integrated Circuit (ASIC) microchip designed for a special application, such as to identify the one or more frames from the plurality of frames.

The topic detection unit 214 comprises suitable logic, circuitry, interfaces, and/or code that may be configured to determine a first score and a second score for each of the one or more frames. In an embodiment, the first score and the second score may be determined based on a set of dissimilar content items, and a set of similar content items among the one or more frames. Further, the first score and the second score of each of the one or more frames are determined based on the saliency score of each content item in the set of dissimilar content items, and the set of similar content items among the one or more frames. Furthermore, the topic detection unit 214 may be configured to determine a likelihood indicative of a topic transition for each of the one or more frames based on the first score and the second score. In an embodiment, the likelihood associated with each frame in the one or more frames indicates whether the frame represents a change in topic. In an embodiment, the topic detection unit 214 may be configured to identify topic transition frames based on the determined likelihood. In an embodiment, the topic detection unit 214 may be implemented as an Application-Specific Integrated Circuit (ASIC) microchip designed for a special application, such as to determine the first score and the second score for each frame in the one or more frames.

The input/output unit 216 comprises suitable logic, circuitry, interfaces, and/or code that may be configured to receive an input or transmit an output to the user-computing device 108. In an embodiment, the input/output unit 216 may transmit the multimedia content to the user-computing device 108. The input/output unit 216 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

Figure 3A:
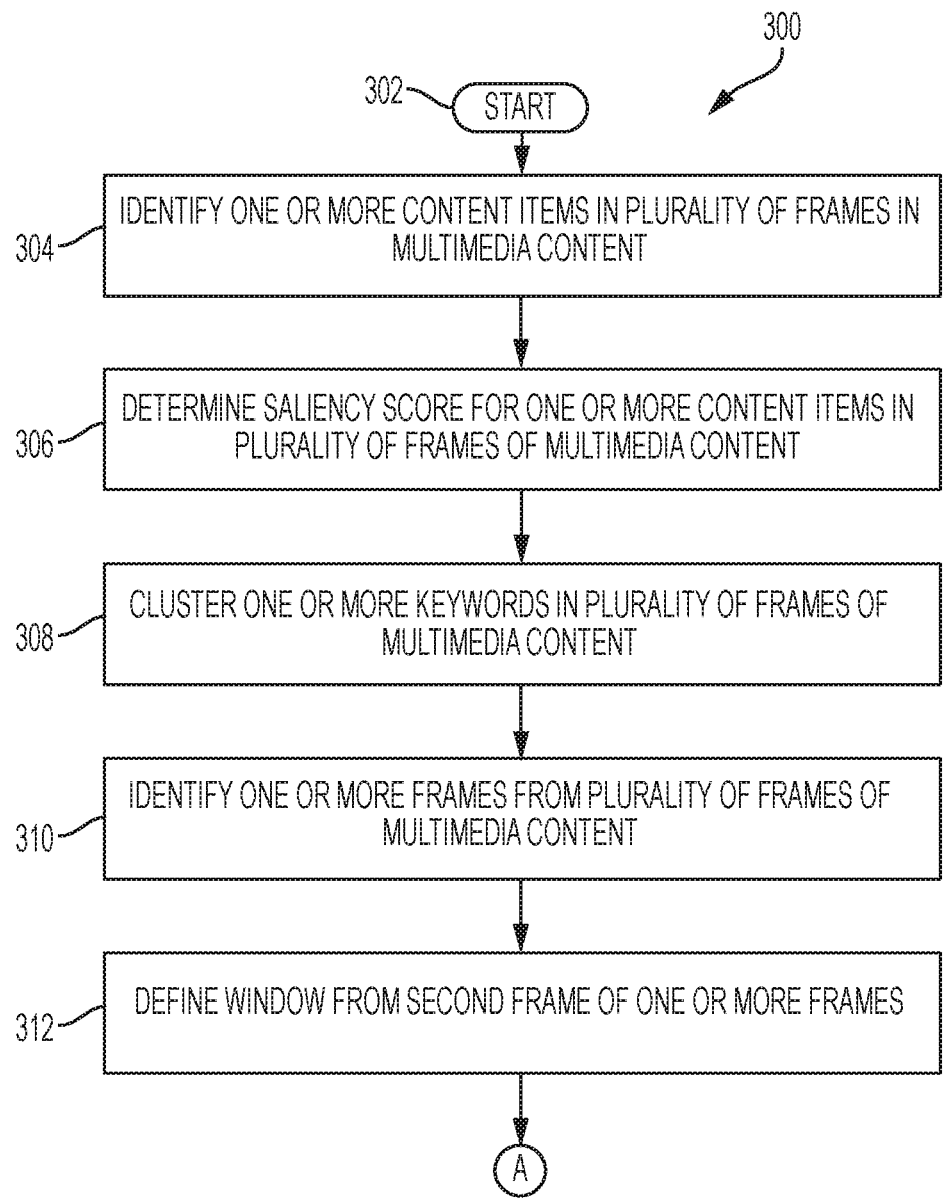
FIG. 3A and FIG. 3B are flowcharts illustrating a method for detecting one or more topic transitions in a multimedia content, in accordance with at least one embodiment.
Figure 3B:
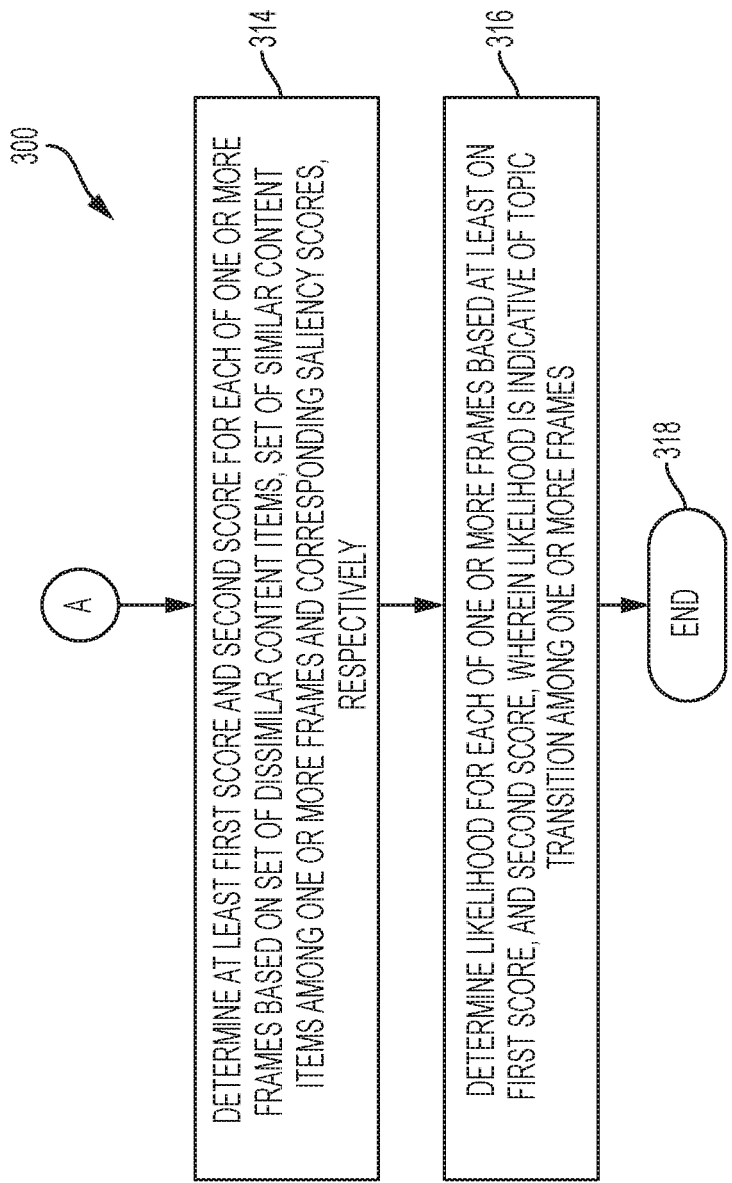

The operation of the content server 102 has been described in conjunction with FIG. 3A and FIG. 3B.

FIG. 3A and FIG. 3B are flowcharts 300 illustrating the method for detecting the one or more topic transitions in the multimedia content, in accordance with at least one embodiment. The flowchart 300 has been described in conjunction with FIG. 1, and FIG. 2. The method starts at step 302.

At step 304, the one or more content items in the plurality of frames of the multimedia content are identified. In an embodiment, the content processing unit 208 in conjunction with the processor 202 may be configured to identify the one or more content items in the plurality of frames of the multimedia content. The one or more content items in the plurality of frames may correspond to the one or more keywords and/or the pixel data in the plurality of frames. In an embodiment, the pixel data may correspond to an element of data that can be associated with a small area or spot in the plurality of frames.

In an embodiment, the processor 202 may retrieve the multimedia content from the database server 104 by transmitting a query to the database server 104. In another embodiment, the input/output unit 216 may receive the query from the user-computing device 108 through the transceiver 206. After the reception of the multimedia content, in an embodiment, the content processing unit 208 may be configured to identify the one or more content items in the plurality of frames of the multimedia content. For example, the content processing unit 208 may identify the one or more keywords in each of the plurality of frames using the character recognition technique. For example, if the multimedia content comprises 50 frames, the content processing unit 208 may perform the character recognition operation on each of the 50 frames to identify the one or more keywords. In an embodiment, examples of the character recognition technique may include an optical character recognition (OCR) technique. In an embodiment, the content processing unit 208 may further be configured to identify coordinates associated with each of the one or more keywords in the plurality of frames. For example, a keyword-1 is located at the top of the $50^{th}$ frame in the multimedia content. The content processing unit 208 may be configured to identify that the coordinates of the keyword-1 is (10, 50) and the frame is $50^{th}$. In an embodiment, the content processing unit 208 may store the coordinates and the associated frame information in the memory 204. In an embodiment, the coordinates correspond to the location of the one or more keywords in the plurality of frames.

At step 306, the saliency score for the one or more content items in the plurality of frames of the multimedia content is determined. In an embodiment, the content processing unit 208 in conjunction with the processor 202 may be configured to determine the saliency score for the one or more content items in the plurality of frames. In an embodiment, the saliency score may be representative of an importance of a content item. In an embodiment, where the content item corresponds to the one or more keywords, the content processing unit 208 may determine saliency score for each keyword in the one or more keywords based on one or more aesthetic features associated with the one or more keywords.

In an embodiment, the one or more aesthetic features may correspond to one or more of, but are not limited to, underline, highlight, bold, italics, font size, and the like. For instance, the presenter in the multimedia content may have underlined a keyword to lay an emphasis on the importance of the keyword. Such underlining of the keyword may correspond to an aesthetic feature. Similarly, the presenter may have highlighted, bolded, or italicized the keyword to lay an emphasis on the importance of the keyword. Such means for emphasizing on the importance of the one or more keywords may constitute the one or more aesthetic features. In an embodiment, the content processing unit 208 may assign a predetermined weightage to each of the one or more aesthetic features, based on which the content processing unit 208 may determine the saliency score for the one or more keywords.

A person having ordinary skills in the art will understand that the scope of the disclosure is not limited to the above-mentioned aesthetic features. In an embodiment, the content processing unit 208 may further utilize features such as, a font size of the one or more keywords, a color of the one or more keywords, and a relative location of the one or more keywords in the corresponding frame to determine the saliency score.

For example, a frame in the multimedia content comprises eight keywords. Using one or more character recognition techniques, the content processing unit 208 may identify the eight keywords. Further, the content processing unit 208 identifies that of the eight keywords, two keywords are highlighted, bolded and appear at top of the frame. Thus, the content processing unit 208 may assign a higher saliency score to the four keywords compared with the remaining keywords.

An example method of determining saliency score of the content items has been described in the U.S. application Ser. No. 15/051,718, filed Feb. 24, 2016, hereby incorporated by reference and assigned to the same assignee, VideoKen, Inc.

At step 308, the one or more content items (e.g., one or more keywords) in the plurality of frames of the multimedia content are clustered. In an embodiment, the pre-processing unit 210 in conjunction with the processor 202 may be configured to cluster the one or more content items in the plurality of frames. In an embodiment, the clustering operation is performed to remove errors introduced during the identification of the one or more content items. A person having ordinary skills in the art will understand that during the identification of the one or more content items certain content items may be identified incorrectly. For instance, the character 'I' may be misidentified as 'L' or '1'. To correct such misidentifications of the one or more content items, the clustering process is performed. For the purpose of simplicity, it is assumed that the one or more content items correspond to the one or more keywords in each of the plurality of frames.

Prior to clustering, the pre-processing unit 210 may stem the one or more keywords, and remove one or more stop words from the one or more keywords. For example, a frame contains four keywords. The content processing unit 208 identifies the four keywords using a character recognition technique. The four identified keywords are 'playing', 'player', 'plays', and 'played'. The pre-processing unit 210 stems the four keywords, wherein stemming corresponds to a technique of reducing a keyword to its basic or root word. Thus, the four identified keywords are reduced to "play". Further, the pre-processing unit 210 may remove the stop words from the one or more keywords. For example, the content processing unit 208 identifies the 50 keywords in a frame using a character recognition technique. The pre-processing unit 210 may remove the stop words such as, but not limited to, 'a', 'an', and', 'it', 'the' in the 50 keywords. In an embodiment, the pre-processing unit 210 may consider articles, prepositions, conjunctions, interjections and/or the like as stop words. However, a person with ordinary skill in the art will appreciate that the removal of the stop words from the one or more keywords and stemming of the one or more keywords may be optional.

After the one or more keywords have been stemmed and the stop words have been removed, in an embodiment, the pre-processing unit 210 may cluster the one or more keywords. In an embodiment, the pre-processing unit 210 may extract the one or more keywords from the memory 204. Thereafter, for each of the one or more keywords, the pre-processing unit 210 may define a cluster. As each of the one or more keywords is represented by the cluster, the pre-processing unit 210 may define one or more clusters. For each pair of clusters from the one or more clusters, the pre-processing unit 210 may determine a distance between the clusters in the pair of clusters based on the keywords in the respective cluster. The pre-processing unit 210 may utilize various state-of-the-art algorithms for distance evaluation between two clusters such as, but not limited to, Lavenshtein distance, Euclidean distance. Thereafter, the pre-processing unit 210 may compare the distance (between the clusters in the pair of clusters) with a first predetermined threshold. If the pre-processing unit 210 determines that the distance between clusters in the pair of clusters is less than the predetermined threshold, the pre-processing unit 210 merges the clusters in the pair of clusters to create a single cluster.

Table 1 illustrates an example of the one or more clusters and the corresponding one or more keywords in the one or more clusters:

TABLE 1

Illustration of one or more clusters and corresponding keywords

| One or more Clusters | Keywords in a Cluster | Coordinates |
| --- | --- | --- |
| Cluster-1 | Represent | (10, 6); timestamp 20 second |
| Cluster-2 | Reprisent | (10, 6); timestamp 21 second |
| Cluster-3 | Embodiment | (1, 7); timestamp 20 second |

It can be observed in Table 1 that the pre-processing unit 210 has defined a "cluster-1" for the keyword "represent", a cluster-2 for keyword "reprisent", and cluster-3 for the keyword "embodiment". Thereafter, the pre-processing unit 210 may create pairs of the one or more clusters (e.g., a pair of cluster-1 and cluster-2 is created, a pair of cluster-3 and cluster-1 is created, and a pair of cluster-2 and cluster-3 is created). Thereafter, the pre-processing unit 210 may determine a distance between the clusters in each pair. As it can be observed that in the pair of clusters containing the cluster-1 and cluster-2, the keywords "represent" and "reprisent" have one character that is different. Therefore, the distance determined for the pair of clusters containing the cluster-1 and cluster-2 is less compared with the other pairs of clusters. The pre-processing unit 210 may merge the cluster-1 and the cluster-2 to create a new cluster. Further, the pre-processing unit 210 may change the keyword "reprisent" to "represent" in the newly created cluster. In an embodiment, the pre-processing unit 210 may utilize a dictionary to change the keyword. In an embodiment, the pre-processing unit 210 may change the keyword "reprisent"

in the corresponding frame at the timestamp mentioned in Table 1. Hence, the pre-processing unit 210 may modify the keyword "reprisent" in the frame at timestamp $21^{st}$ second of the multimedia content.

Similarly, the pre-processing unit 210 may merge other clusters in the pair of clusters based on the distance between the clusters.

A person having ordinary skills in the art will appreciate that the scope of the disclosure is not limited to clustering the one or more keywords as per the method described supra. In an embodiment, the pre-processing unit 210 may employ other known techniques to cluster the one or more keywords.

At step 310, the one or more frames from the plurality of frames of the multimedia content are identified. In an embodiment, the frame detection unit 212 in conjunction with the processor 202 may be configured to identify the one or more frames from the plurality of frames of the multimedia content. In an embodiment, the frame detection unit 212 may compare the one or more content items in the first frame of the plurality of frames with the one or more content items in the first set of frames of the plurality of frames. In an embodiment, the first set of frames occurs temporally prior to the first frame. In an embodiment, the frame detection unit 212 may perform the comparison to determine a keyword overlap score, and a pixel difference to identify the one or more frames. In an embodiment, to determine the keyword overlap score, the one or more keywords (i.e., content item) identified in the first frame are compared with the one or more keywords identified in the first set of frames. Further, to determine the pixel difference, the pixel data of the first frame is compared with the pixel data of the first set of frames.

Keyword Overlap Score

As discussed supra that the one or more keywords are identified in each frame of the plurality of frames. The frame detection unit 212 may retrieve the one or more keywords identified in the first frame from the memory 204. Further, the frame detection unit 212 may retrieve the one or more keywords from the first set of frames (that occur temporally prior to the first frame). Thereafter, the frame detection unit 212 may determine if the one or more keywords identified in the first frame are same as the one or more keywords in the first set of frames. Based on the degree of similarity between the one or more keywords identified in the first frame and the one or more keywords identified in the first set of frames the keyword overlap score is determined. In an embodiment, if the number of one or more keywords that are same is high, then the keyword overlap score will also be high.

Pixel Difference

In an embodiment, the frame detection unit 212 in conjunction with the processor 202 may determine the pixel difference between the first frame in the plurality of frames and the first set of frames in the plurality of frames. In an embodiment, the pixel difference may correspond to a set of differences obtained by subtracting the first frame from each frame in the first set of frames. In an embodiment, if the similarity between the first frame and a frame in the first set of frames is high, the pixel difference will be low.

The frame detection unit 212 may identify a frame from the plurality of frames as a unique frame when the keyword overlap score is below a predetermined keyword overlap threshold (p) and each difference in the set of differences (i.e., pixel difference) exceeds a predetermined pixel difference threshold (γ). Further, the identified unique frames correspond to the one or more frames.

A person skilled in the art will understand that the scope of the disclosure should not be limited to identifying the one or more frames from the plurality of frames based on the aforementioned technique or factors. In an embodiment, any other known technique may be used to identify the one or more frames. An example of identification of the one or more frames has been discussed later in conjunction with FIG. 5.

At step 312, a window is defined from a second frame of the one or more frames from the plurality of frames of the multimedia content. In an embodiment, the topic detection unit 214 in conjunction with the processor 202 may be configured to define the window (N) from the second frame of the one or more frames. In an embodiment, the window may encompass a second set of frames from the one or more frames. Further, the second set of frames (N) occurs temporally prior to the second frame. Furthermore, the topic detection unit 214 in conjunction with the processor 202 may be configured to compare the one or more content items in the second frame with the one or more content items in the second set of frames to identify the set of similar content items and the set of dissimilar content items in the second frame.

In an exemplary implementation, let the one or more frames be denoted as, $S=\{S_1, S_2, S_3, \ldots, S_T\}$ and let the one or more content items (W) corresponding to a frame $S_t$ be denoted as, $W_t = \{w_1^t, w_2^t, w_3^t, \ldots, w_{|S_t|}^t\}$. Further, let the second set of frames corresponding to the frame $S_t$ be denoted as, $N_{(t-|N_t|\le j<t)}\{S_j\}$ and the one or more content items corresponding to the second set of frames $N_t$ be denoted as, $W_{N_t} = U_{j\in N_t}\{W_j\}$. After the comparison between the one or more content items in the second frame and the one or more content items in the second set of frames, the topic detection unit 214 may be configured to identify the set of dissimilar content items and the set of similar content items. Such that the set of dissimilar content items ($v_j$) in the frame $S_t$ may be represented as, $v_j \in \overline{W_{N_t}} \cap W_t$ and the set of similar content items ($c_t$) in the frame $S_t$ may be represented as, $c_t = \{v|v \in W_{N_t} \cap W_t\}$.

For example, let $W_t$={determine, saliency, score, first, text, frame, techniques, comparison, pixel}, let $W_{N_t}$={score, probability, pixel, first, frame}. In this scenario, the set of dissimilar content items $v_j$={determine, saliency, text, techniques, comparison} and the set of similar content items $c_t$={score, pixel, first, frame}.

A person skilled in the art will understand that the scope of the disclosure should not be limited to identifying the set of dissimilar content items and the set of similar content items based on the aforementioned factors and using the aforementioned techniques. Further, the examples provided in supra are for illustrative purposes and should not be construed to limit the scope of the disclosure.

At step 314, the first score and the second score for each of the one or more frames are determined. In an embodiment, the topic detection unit 214 in conjunction with the processor 202 may be configured to determine the first score and the second score for each of the one or more frames. The topic detection unit 214 may determine the first score and the second score based on the set of dissimilar content items and the set of similar content items. In an embodiment, the topic detection unit 214 may utilize the saliency score associated with each content item in the set of dissimilar content items and the set of similar content items to determine the first score and the second score for each of the one or more frames.

In an exemplary implementation, let a function (V) that takes a content item and a frame from the one or more frames as input, and returns the saliency score (R) corresponding to the content item be represented as, V:W×S→R (where, W=∪$_j${W$_j$}). For example, a content item $w_1^t$ in a frame $S_t$ and the frame $S_t$ are taken as input for the function V. Then the output (R) of the function V gives the saliency score of the content item $w_1^t$ in the frame $S_t$.

In an embodiment, the topic detection unit 214 may determine the first score ($f_1^{S_t}$) for a frame $S_t$ based on a vector ($F_{S_t}$). The vector $F_{S_t}$ corresponds to a set of the saliency scores of the set of dissimilar content items in the frame $S_t$ of the one or more frames. Further, the saliency score of the set of dissimilar content items in the one or more frames is determined using the function (V), as discussed supra. The vector $F_{S_t}$ may be represented by using equation 1 as shown below:

$$F_{S_t} = \{V(v_1, S_t), V(v_2, S_t), V(v_3, S_t), \ldots\} \quad (1)$$

where, $F_{S_t}$ is the vector of the set of saliency scores of the set of dissimilar content items in the frame $S_t$, and $v_1, v_2, v_3, \ldots$ corresponds to dissimilar content items in the set of dissimilar content items in the frame $S_t$.

Furthermore, the topic detection unit 214 in conjunction with the processor 202 may determine the first score $f_1^{S_t}$ for the frame $S_t$ by using equation 2 as shown below:

$$f_1^{S_t} = zF_{S_t} \quad (2)$$

where, z is a weight vector. In an embodiment, the weight vector z is set as, z={1, 0.6, 0.36, 0.216 . . . } (determined based on experiments).

In an embodiment, let $F_{S_t}$={0.9, 0.87, 0.68, 0.59}, then the first score $f_1^{S_t}$={(1×0.9)+(0.6×0.87)+(0.36×0.68)+(0.216×0.59)} i.e., 1.658016.

A person having ordinary skill in the art will understand that the abovementioned exemplary scenario is provided for illustrative purposes and should not be construed to limit the scope of the disclosure.

In an embodiment, the topic detection unit 214 in conjunction with the processor 202 may determine the second score $f_2^{S_t}$ for a frame $S_t$ based on the vector (V), as discussed supra, by using equation 3 as shown below.

$$f_2^{S_t} = \sum_{w \in c_t} \frac{\max\{V(w, j) | j \in N_t\}}{V(w, S_t)} \quad (3)$$

wherein, max{V(w,j)|j∈$N_t$, is the maximum saliency score of a similar content item w in the set of similar content items $c_t$, in the second set of frames $N_t$, and V(w,$S_t$) is the saliency score the similar content item w in the set of similar content items ($c_t$) in the frame $S_t$.

For example, let a set of maximum saliency score of a set of similar content items in the second set of frames $N_t$ of the frame $S_t$ be {0.7, 0.6, 0.65} and the saliency score of the set of similar content items in the frame $S_t$ be {0.8, 0.65, 0.4}. Thereafter, using equation 3 the second score $f_2^{S_t}$ for the frame $S_t$ is determined as 3.42407.

A person skilled in the art will understand that the scope of the disclosure should not be limited to determining the first score and the second score based on the aforementioned factors and using the aforementioned techniques. Further, the examples provided in supra are for illustrative purposes and should not be construed to limit the scope of the disclosure.

At step 316, the likelihood indicative of the topic transition among the one or more frames is determined. In an embodiment, the topic detection unit 214 in conjunction with the processor 202 may be configured to determine the likelihood indicative of the topic transition among the one or more frames. In an embodiment, the topic transition unit 214 may determine the likelihood based on the first score and the second score of each of the one or more frames. In an embodiment, the first score $f_1^{S_t}$ and the second score $f_2^{S_t}$ of the frame $S_t$ may be represented by a two dimensional vector $f^{S_t}$, such that $f^{S_t}=\{f_1^{S_t}, f_2^{S_t}\}$. The topic detection unit 214 may determine the likelihood indicative of the topic transition by using equation 4 as shown below:

$$P(S_t = 1 | f^{S_t}) = \frac{P(f^{S_t} | S_t = 1) \times P(S_t = 1)}{P(f^{S_t})} \quad (4)$$

where, $P(S_t=1|f^{S_t})$ represents a conditional likelihood of the frame $S_t$ to be indicative of the topic transition when $f^{S_t}=\{f_1^{S_t}, f_2^{S_t}\}$, $P(f^{S_t}|S_t=1)$ represents a conditional likelihood of the occurrence of $f^{S_t}=\{f_1^{S_t}, f_2^{S_t}\}$, when the frame $S_t$ is indicative of the topic transition, $P(S_t=1)$ represents a likelihood that the frame $S_t$ is indicative of the topic transition, and $P(f^{S_t})$ represents a likelihood of occurrence of $f^{S_t}=\{f_1^{S_t}, f_2^{S_t}\}$ in the frame $S_t$.

In an embodiment, the topic detection unit 214 may assign a topic transition score to each frame in the one or more frames based on the determined likelihood. Further, the topic detection unit 214 may compare the topic transition score to a predetermined topic transition threshold. Furthermore, the topic detection unit 214 may label each frame ($S_t$) in the one or more frames, with the topic transition score higher than the predetermined topic transition threshold, as '1' and the remaining frames as '0'. In an embodiment, frames with label '1', in the one or more frames, may correspond to topic transition frames. For example, let the predetermined topic transition threshold be 5.8 and let the topic transition score of frame-1=4.8, frame-2=6, frame-3=5.8. In this scenario, the topic detection unit 214 labels frame-2 and frame-3 as '1' and frame-2 and frame-3 are identified as the topic transition frames.

In another embodiment, the topic detection unit 214 in conjunction with the processor 202 may utilize a normal distribution over the first score and the second score to determine the likelihood indicative of the topic transition. The topic detection unit 214 may utilize the normal distribution over the first score and the second score by using equation 5 as shown below:

$$P(S_t=1|f)=N(f_1^{S_t}|\mu_1,\sigma_1) \times N(f_2^{S_t}|\mu_2,\sigma_2) \quad (5)$$

where, $N(f_1^{S_t}|\mu_1, \sigma_1)$ represents the normal distribution over $f_1^{S_t}$, with $\mu_1$ as mean of $f_1^{S_t}$ and $\sigma_1$ as standard deviation of $f_1^{S_t}$. $N(f_2^{S_t}|\mu_2,\sigma_2)$ represents the normal distribution over $f_2^{S_t}$, with $\mu_2$ as mean of $f_2^{S_t}$ and $\sigma_2$ as standard deviation of $f_2^{S_t}$. In an embodiment, $\mu_1$ is set as max ($f_1^{S_t}$) and $\mu_2$ as min ($f_2^{S_t}$) (determined based on experiments).

A person skilled in the art will understand that the scope of the disclosure should not be limited to determining the likelihood indicative of the topic transition based on the aforementioned factors and using the aforementioned techniques. Further, the examples provided in supra are for illustrative purposes and should not be construed to limit the scope of the disclosure. Control passes to end step 318.

Figure 4:
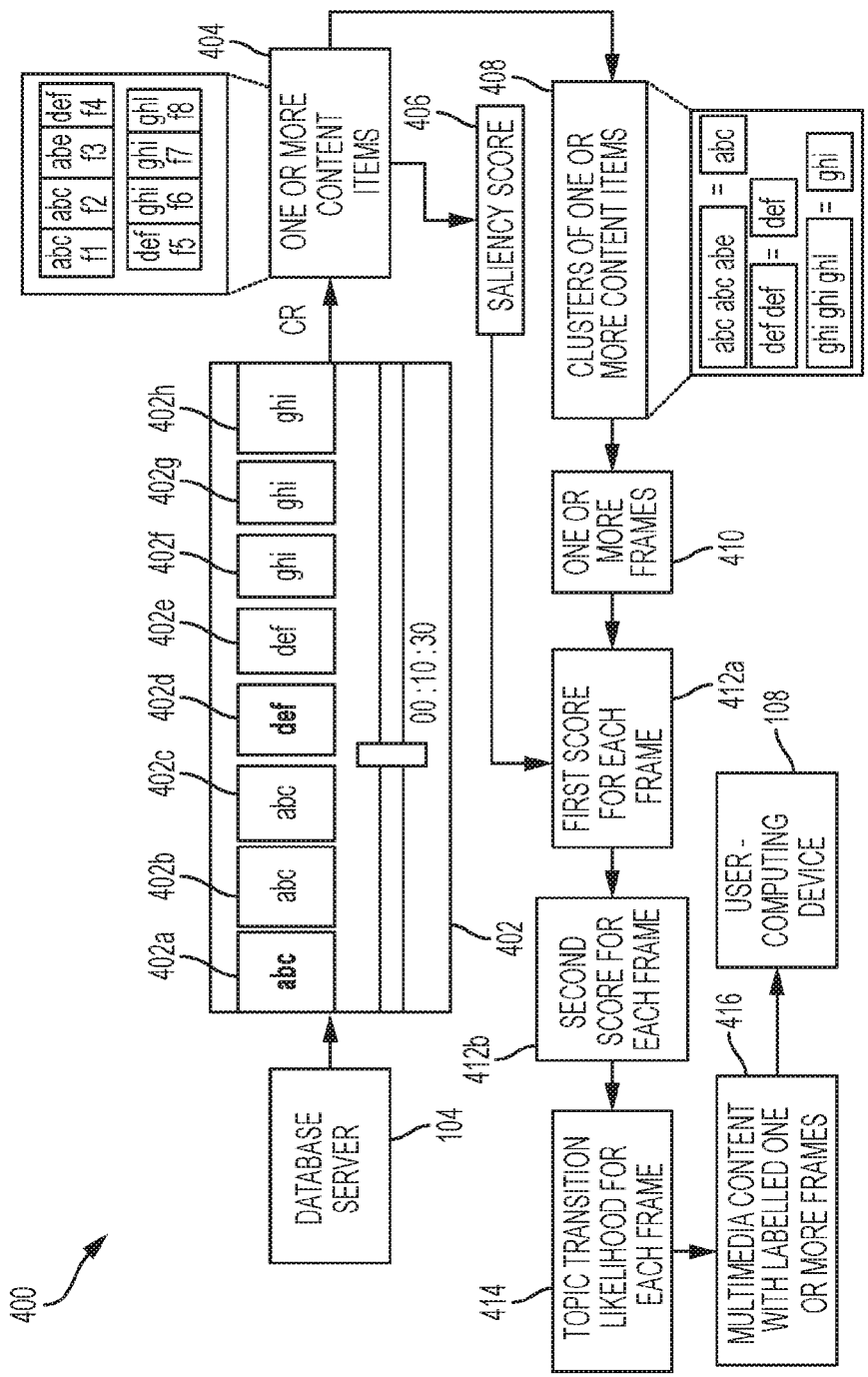
FIG. 4 is a block diagram that illustrates an exemplary scenario to detect one or more topic transitions in the multimedia content (e.g., educational video) in accordance with at least one embodiment.

FIG. 4 is a block diagram that illustrates an exemplary scenario 400 to detect the one or more topic transitions in the multimedia content (e.g., educational video) in accordance with at least one embodiment. The FIG. 4 is described in conjunction with FIG. 1, FIG. 2, FIG. 3A, and FIG. 3B.

With reference to FIG. 4, an educational video (denoted by 402) may be retrieved by the content server 102 from the database server 104, via the network 106. The educational video 402 may comprise a plurality of frames (denoted by 402a, 402b, 402c . . . , 402h). After retrieving the educational video (denoted by 402), the content processing unit 208 may be configured to identify the one or more content items (denoted by 404) by performing character recognition (CR) operations on the plurality of frames (denoted by 402a, 402b, 402c, . . . 402h).

After identifying the one or more content items 404, the saliency score (denoted by 406) may be determined for each of the one or more content items 404. In an embodiment, the content processing unit 208 may be configured to determine the saliency score (denoted by 406). Further, the pre-processing unit 210 may be configured to determine the clusters of one or more content items (depicted by 408a, 408b, and 408c).

After determining the clusters of the one or more content items (depicted by 408a, 408b, and 408c), the frame detection unit 212 may be configured to identify the one or more frames (denoted by 410) from the plurality of frames (402a, 402b, 402c, . . . , 402h). The identification of one or more frames from the plurality of frames in the multimedia content has been explained in conjunction with FIG. 5. In response to the identification of the one or more frames (denoted by 410), the topic detection unit 214 may be configured to determine the first score (denoted by 412a) for each frame in the one or more frames 410. Further, the topic detection unit 214 may be configured to determine the second score (denoted by 412b) for each frame in the one or more frames 410.

Based on the determined first score 412a and the second score 412b the topic detection unit 214 may be configured to determine the likelihood indicative of the topic transition (depicted by 414) for each frame in the one or more frames (depicted by 410). Further, based on the likelihood indicative of the topic transition, the topic detection unit 214 may label the one or more frames. In an embodiment, the topic detection unit 214 may label the frame in the one or more frame indicating the topic transition as '1' and the remaining one or more frames as '0'. After the labeling of the one or more frames the transceiver 206 may transmit the multimedia content, with labeled one or more frames (depicted by 416) to the user-computing device 108.

The user interface displayed on the display screen on the user-computing device 108 is explained later in conjunction with FIG. 6.

Figure 5:
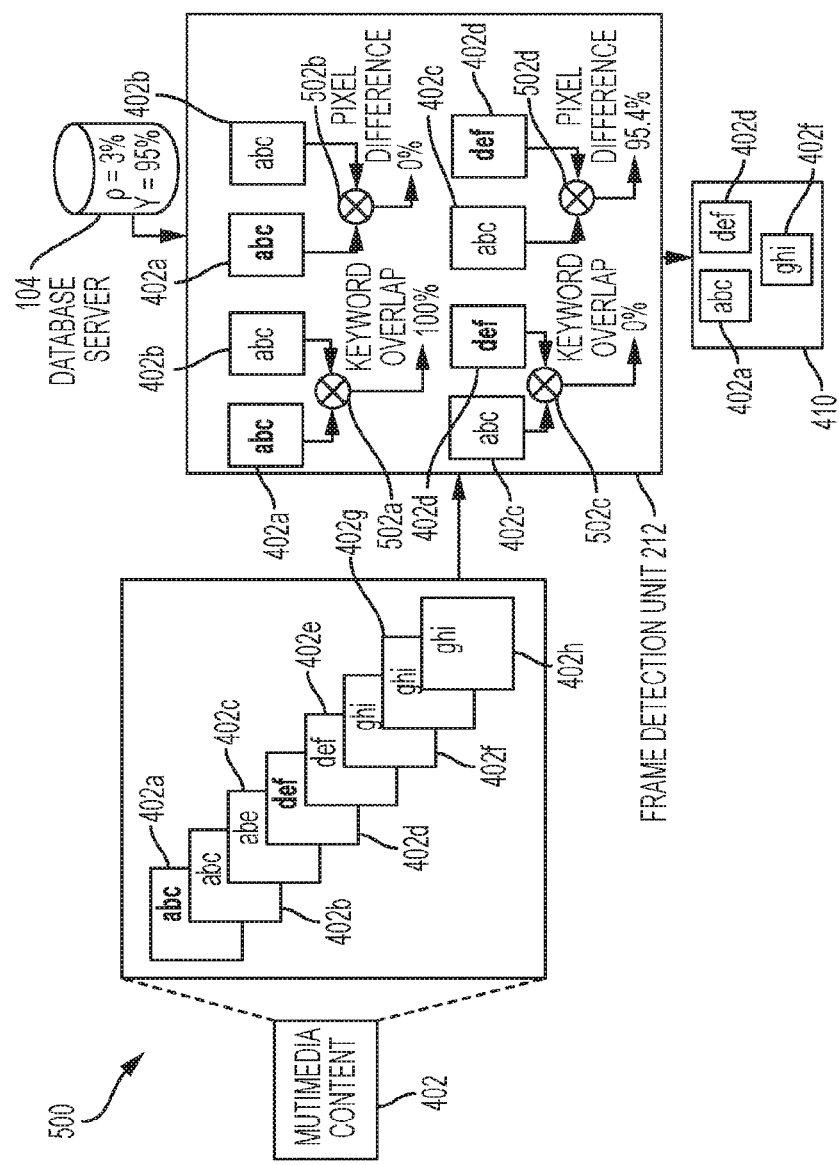
FIG. 5 illustrates an exemplary scenario for identification of one or more frames from a plurality of frames of a multimedia content, in accordance with at least one embodiment.

FIG. 5 illustrates an exemplary scenario for the identification of the one or more frames from the plurality of frames in the multimedia content (e.g., an educational video), in accordance with at least one embodiment. FIG. 5 is explained in conjunction with FIG. 1, FIG. 2, FIG. 3A, FIG. 3B, and FIG. 4.

The scenario 500 comprises the educational video 402. Further, the multimedia content comprises the plurality of frames (depicted by 402a, 402b, 402c, . . . , 402h). In an embodiment, the frame detection unit 212 may compare the first frame in the plurality of frames with the first set of frames (depicted by 502a, 502b, 502c, 502d). The frame detection unit 212 may utilize the one or more comparison techniques such as, but not limited to, keyword overlap (depicted by 502a, 502c), pixel difference (depicted by 502b, 502d) for comparing the first frame in the plurality of frames with the first set of frames. In an embodiment, the frame detection unit 212 may compare the keyword overlap score and the pixel difference score of each frame in the one or more frames with the predetermined keyword overlap threshold ($\rho$) and the predetermined pixel difference threshold ($\gamma$) stored in the database server 104. On comparing the first frame (depicted by 402b) and a frame in the first set of frames (depicted by 402a), the keyword overlap score is determined to be 100% (depicted by 502a) and the pixel difference (depicted by 502b) is determined to be 0%. Further, on comparing the first frame (depicted by 402c) and a frame in the first set of frames (depicted by 402d), the keyword overlap score is determined to be 0% (depicted by 502c) and the pixel difference is determined to be 95.4% (depicted by 502d). Therefore the frame 402b is not identified as the one or more frames and the frame 402d is identified as the one or more frames.

A person skilled in the art will understand that the abovementioned exemplary scenario is described herein for illustrative purposes and should not be construed to limit the scope of the disclosure.

Figure 6:
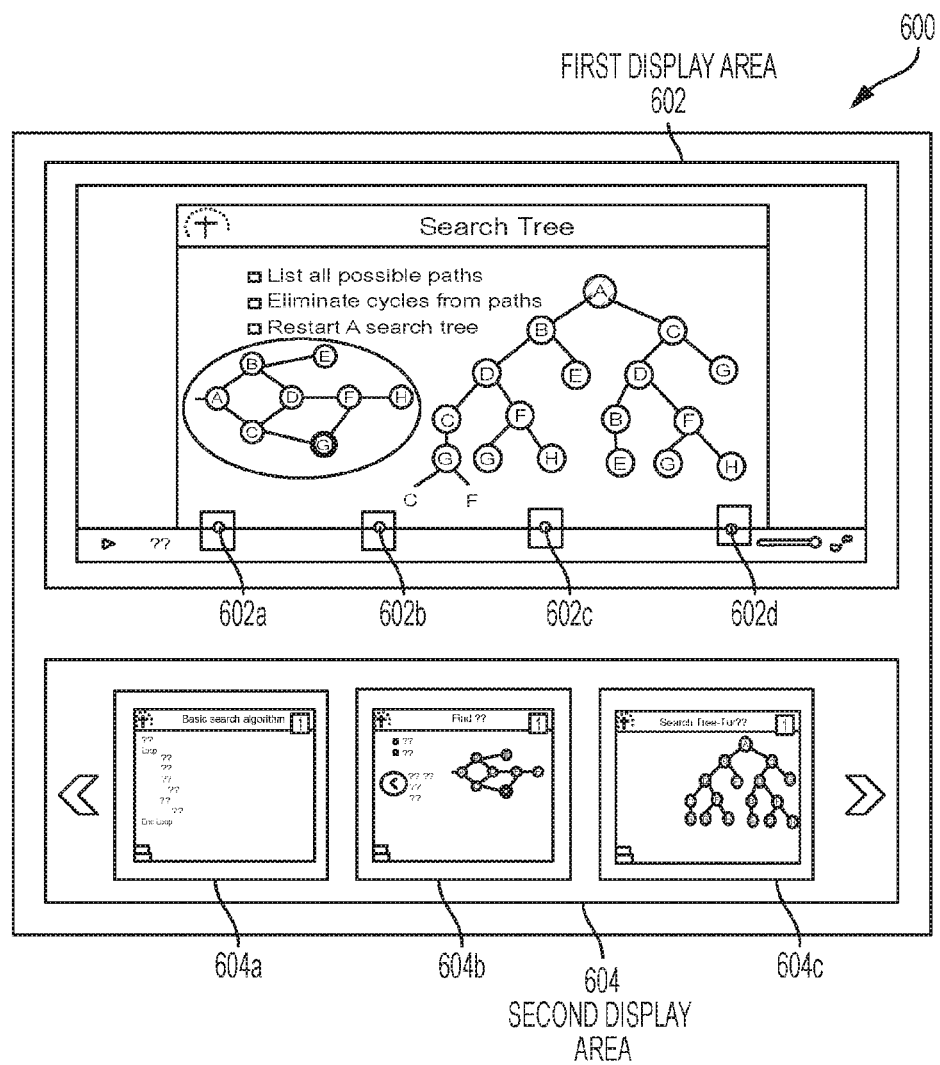
FIG. 6 illustrates an example user-interface presented on the user-computing device to display the multimedia content with detected one or more topic transitions, in accordance with at least one embodiment.

FIG. 6 illustrates an example user-interface 600 presented on the user-computing device 108 to display the multimedia content with detected topic transitions, in accordance with at least one embodiment.

The user-interface 600 comprises a first display area 602, and a second display area 604. The first display area 602 displays the multimedia content. In an embodiment, the first display area 602 may contain command buttons such as, play, rewind, forward, and pause, to control playback of the multimedia content. In an embodiment, a navigation bar may be displayed on the first display area 602 that enables the user to navigate through the multimedia content. In another embodiment, one or more icons may be displayed on the navigation bar (depicted by 602a, 602b, 602c, and 602d) where each icon is indicative of the topic transition in the multimedia content. In an embodiment, during the playback of the multimedia content, the first display area 602 may display the duration of the multimedia content. The second display area 604 displays the topic transition frames (depicted by 604a, 604b, and 604c) indicating the one or more topic transitions in the multimedia content. In an embodiment, the user may directly select a topic transition frame from the second display area 604 for navigating through various topics in the multimedia content.

A person skilled in the art will understand that the user-interface 600 is described herein for illustrative purposes and should not be construed to limit the scope of the disclosure.

In another implementation of the disclosed method and the system, a table of contents associated with the one or more topic transitions in the multimedia content may be created. In an embodiment, a table creation unit (not shown) may be configured to create the table of contents associated with the one or more topic transitions in the multimedia content.

Various embodiments of the disclosure encompass numerous advantages including methods and systems for detecting topic transitions in a multimedia content. In an embodiment, the methods and systems may be utilized to identify one or more topic transitions in the multimedia content and thereafter label one or more frames in a plurality of frames of the multimedia content. The methods and systems enable the user to navigate through various topics discussed in the multimedia content. Further, based on the labels on the one or more frames in the plurality of frames of the multimedia content, the user may be able to identify the topic changeover points associated with the multimedia content without requiring manual detection. In an embodiment, the methods and systems provides the user interface that displays the one or more labelled frames, in the multimedia content, to the user. Thus, the user may save time and understand the topics in the multimedia segment in a better manner.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like.

The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for detecting topic transition in the multimedia content have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for detecting one or more topic transition points in multimedia content, the method comprising:
    identifying, by one or more processors, one or more frames from a plurality of frames in the multimedia content, wherein the one or more frames are identified based on a comparison between one or more content items in a first frame of the plurality of frames and the one or more content items in a first set of frames of the plurality of frames, an occurrence of the first set of frames is temporally prior to the first frame;

determining, by the one or more processors, at least a first score and a second score for each of the one or more frames based on a set of dissimilar content items and a set of similar content items among the one or more frames; and determining, by the one or more processors, a likelihood for each of the one or more frames, wherein the likelihood is indicative of a topic transition for each of the plurality of the one or more frames based at least on the first score and the second score, wherein determining of the likelihood for each of the one or more frames comprises identifying the one or more topic transition points in the multimedia content using the determined first score and the determined second score for each of the plurality of frames, wherein the identifying of the one or more topic transition points further comprises
determining the likelihood of the topic transition among the plurality of frames by using $$P(S_t = 1 \mid f^{S_t}) = \frac{P(f^{S_t} \mid S_t = 1) \times P(S_t = 1)}{P(f^{S_t})}$$

where $P(S_t=1|f^{S_t})$ represents a conditional likelihood of frame $S_t$ to be indicative of the topic transition, when two-dimensional vector $f^{S_t}=\{f_1^{S_t},f_2^{S_t}\}$, $P(f^{S_t}|S_t=1)$ represents a conditional likelihood of occurrence of $f^{S_t}=\{f_1^{S_t},f_2^{S_t}\}$, when the frame $S_t$ is indicative of the topic transition, $P(S_t=1)$ represents a likelihood that the frame $S_t$ is indicative of the topic transition, and $P(f^{S_t})$ represents a likelihood of occurrence of $f^{S_t}=\{f_1^{S_t}, f_2^{S_t}\}$ in the frame $S_t$.

2. A process for identifying one or more topic transition points in multimedia content, comprising:
extracting one or more content items from a plurality of frames in the multimedia content, wherein the one of more content items comprise one or more keywords displayed during playback of the multimedia content and are obtained through optical character recognition;
calculating a first score and a second score for each of the plurality of frames, the first score is based on a set of dissimilar content items, and the second score is based a set of similar content items, among the plurality of frames; and
identifying the one or more topic transition points in the multimedia content using the calculated first score and the calculated second score for each of the plurality of frames, wherein the identifying of the one or more topic transition points further comprises
determining a likelihood of a topic transition among the plurality of frames by using $$P(S_t = 1 \mid f^{S_t}) = \frac{P(f^{S_t} \mid S_t = 1) \times P(S_t = 1)}{P(f^{S_t})}$$

where $P(S_t=1|f^{S_t})$ represents a conditional likelihood of frame $S_t$ to be indicative of the topic transition, when two-dimensional vector $f^{S_t}=\{f_1^{S_t},f_2^{S_t}\}$, $P(f^{S_t}|S_t=1)$ represents a conditional likelihood of occurrence of $f^{S_t}=\{f_1^{S_t},f_2^{S_t}\}$, when the frame $S_t$ is indicative of the topic transition, $P(S_t=1)$ represents a likelihood that the frame $S_t$ is indicative of the topic transition, and $P(f^{S_t})$ represents a likelihood of occurrence of $f^{S_t}=\{f_1^{S_t}, f_2^{S_t}\}$ in the frame $S_t$.

3. The process of claim 2, further comprising:
calculating a saliency score for the one or more content items in the plurality of frames, wherein
the saliency score represents importance of the one or more content items.

4. The process of claim 2, wherein the calculating of the first score comprises:
determining the first score for the frame $S_t$ based on a vector, wherein
the first score is defined by $f_1^{S_t}=zF_{S_t}$, where z is a weight vector, and
the vector is defined by $F_{S_t}=\{V(v_1,S_t),V(v_2,S_t),V(v_3,S_t),\ldots\}$, where $F_{S_t}$ is the vector of a set of saliency scores of the set of dissimilar content items in the frame $S_t$, and $v_1, v_2, v_3, \ldots$ corresponds to dissimilar content items in the set of dissimilar content items in the frame $S_t$.

5. The process of claim 2, wherein the calculating of the second score comprises:
determining the second score for the frame $S_t$ based on a vector, wherein
the second score is defined by $$f_2^{S_t} = \Sigma w \in c_t \frac{\max V(w, j) \mid j \in N_t}{V(w, S_t)},$$

where
$\max V(w,j)|j \in N_t$ is a maximum saliency score of similar content item w in the set of similar content items $c_t$ in a set of frames $N_t$, and
$V(w,S_t)$ is a saliency score of the similar content item w in the set of similar content items $c_t$ in the frame $S_t$.

6. The process of claim 2, further comprising:
identifying the set of dissimilar content items and the set of similar content items among the plurality of frames by comparing the one or more content items in a frame and one or more content items in a set of frames.

7. The process of claim 2, wherein the calculating of the first score and the second score comprises utilizing a saliency score associated with each content item in the set of dissimilar content items and the set of similar content items.

8. The process of claim 2, wherein the identifying of the one or more topic transition points comprises assigning a topic transition score to each frame based on the determined likelihood.

9. The process of claim 8, wherein the identifying of the one or more topic transition points comprises comparing the topic transition score for each frame to a predetermined topic transition threshold.

10. The process of claim 2, wherein the identifying of the one or more topic transition points comprises
determining a likelihood of a topic transition by utilizing a normal distribution over the first score and the second score.

11. The process of claim 10, wherein the normal distribution is defined by $$P(S_t=1|f)=N(f_1^{S_t}|\mu_1,\sigma_1) \times N(f_2^{S_t}|\mu_2,\sigma_2)$$

where $N(f_1^{S_t}|\mu_1,\sigma_1)$ is the normal distribution over $f_1^{S_t},\mu_1$ as a means of $f_1^{S_t}$ and $\sigma_1$ as a standard deviation of $f_1^{S_t}$, and $N(f_2^{S_t}|\mu_2,\sigma_2)$ is the normal distribution over $f_2^{S_t}$, $\mu_2$ as a means of $f_2^{S_t}$ and $\sigma_2$ as a standard deviation of $f_2^{S_t}$.

12. The process of claim 11, wherein $\mu_1$ is set as max $f_1^{S_t}$ and $\mu_2$ is set as max $f_2^{S_t}$.

* * * * *